Aug. 11, 1942.  J. E. HORSTE  2,292,943
MOWING ATTACHMENT FOR TRACTORS
Original Filed Nov. 1, 1940  3 Sheets—Sheet 1

Joseph E. Horste INVENTOR
BY
J. E. Thomas
ATTORNEY

Aug. 11, 1942.   J. E. HORSTE   2,292,943
MOWING ATTACHMENT FOR TRACTORS
Original Filed Nov. 1, 1940   3 Sheets-Sheet 2

INVENTOR
Joseph E. Horste
BY
S. E. Thomas
ATTORNEY

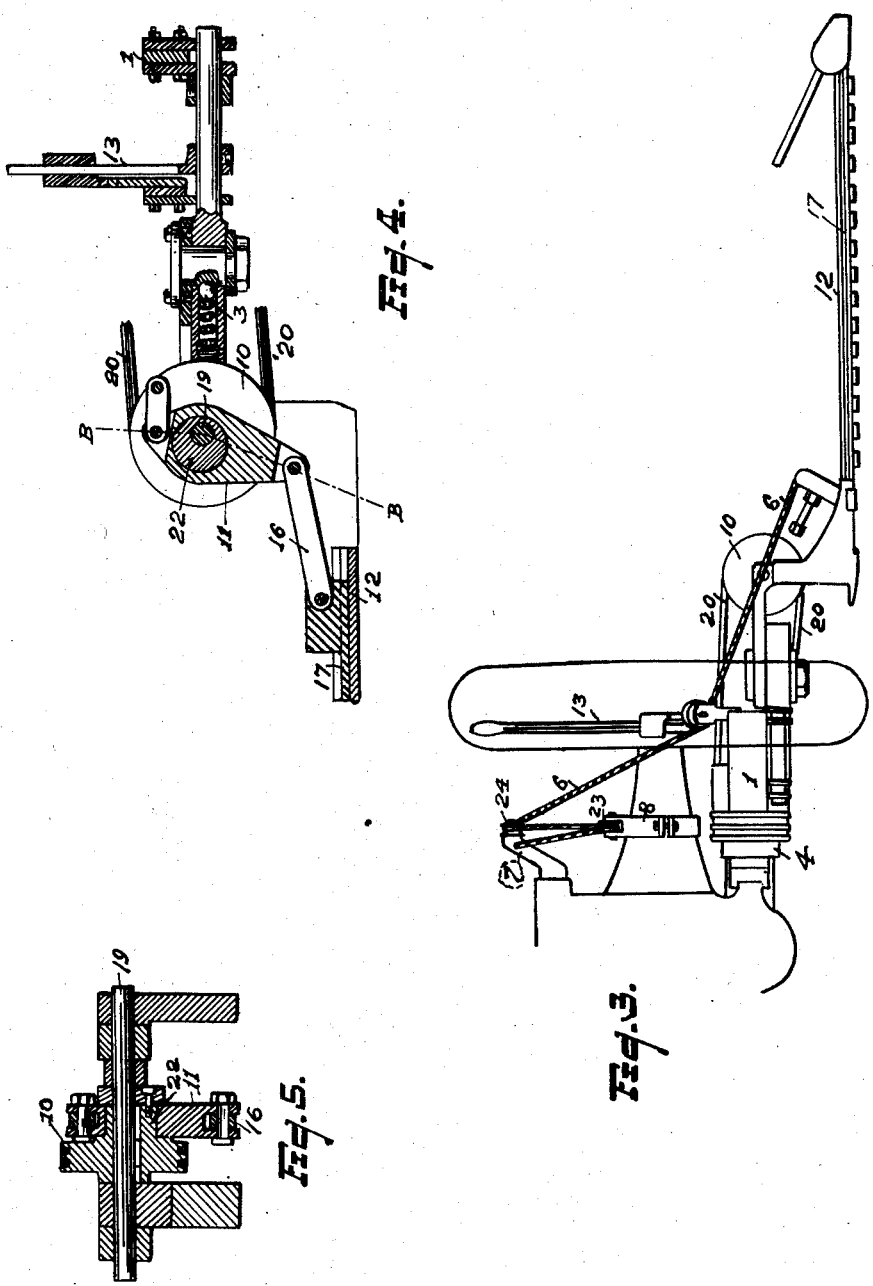

Patented Aug. 11, 1942

2,292,943

UNITED STATES PATENT OFFICE 2,292,943

MOWING ATTACHMENT FOR TRACTORS

Joseph E. Horste, Detroit, Mich.

Original application November 1, 1940, Serial No. 363,798, now Patent No. 2,260,668, dated October 28, 1941. Divided and this application July 23, 1941, Serial No. 403,677

2 Claims. (Cl. 56—25)

My invention relates to a mowing attachment for tractors, shown in the accompanying drawings, and is more particularly a division of an application filed by me November 1, 1940, Serial No. 363,798, now Patent 2,260,668, granted October 28, 1941. A primary object of the invention is a simplified construction, whereby the manufacturing cost has been reduced without impairment of its efficiency—while the operating speed has been multiplied. One feature of the invention—which will be hereafter described in further detail—relates to a cam, integral with a flywheel, adapted to actuate a rocker-arm to reciprocate the sickle of the mowing bar.

A further object of the invention is to provide an attachment which may be quickly installed on or removed from the tractor without changing the construction of the latter; other advantages and improvements will hereafter appear.

In the drawings accompanying this specification:

Figure 3 is a rear elevation of the mowing attachment secured to the tractor, a fragment of the latter being also indicated by broken lines.

Figure 4 is a vertical fragmentary sectional view taken on or about A—A Figure 1, looking in the direction indicated by the arrows.

Figure 5 is a vertical sectional view of a detail, taken on or about broken line B—B—see Figure 4.

Figure 1:
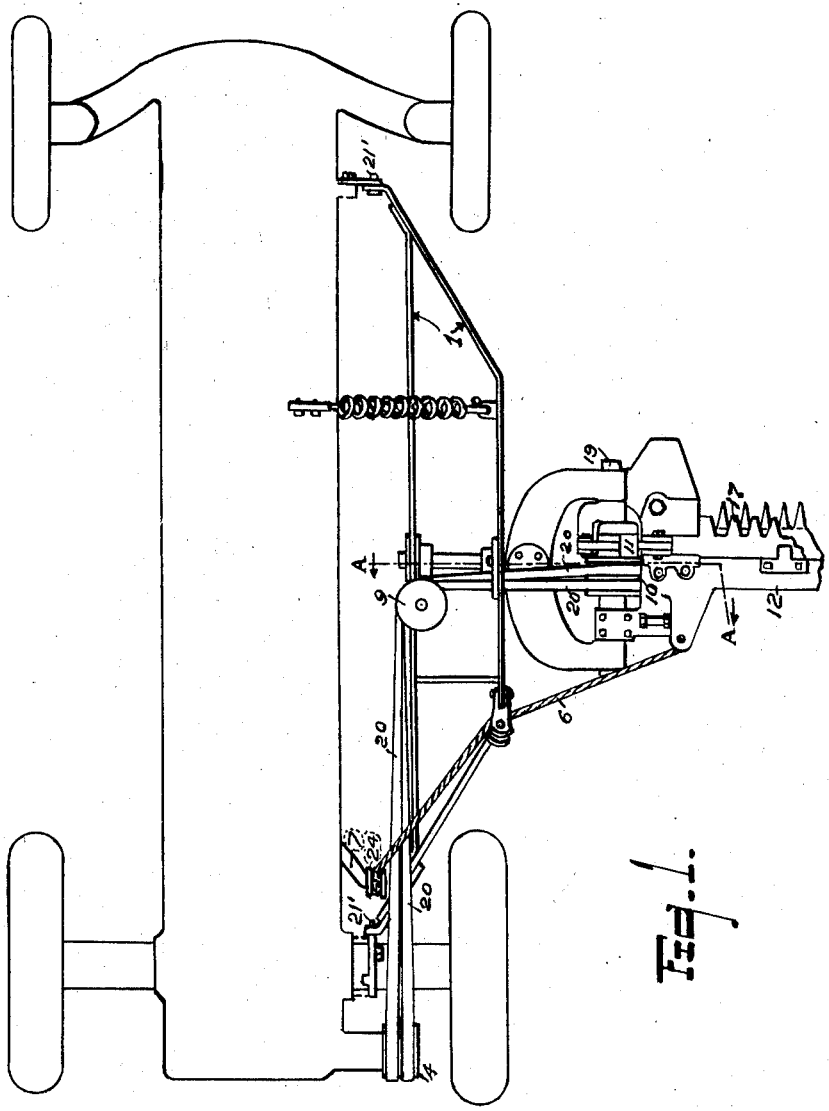
Figure 1 is a plan view of the mowing attachment secured to a tractor—indicated by broken lines—a fragment of the cutter only being shown.

Referring now to the reference characters upon the drawings:

The mowing bar 12, is attached to the tractor by a specially constructed frame 1, which permits fastening to the tractor at only two points 21—21', see Fig. 1. This two-point connection facilitates removal when the tractor is to be used for other purposes. The mowing bar 12, is of standard construction and the sickle 17, is operated in a reciprocal manner by a cam 22, see Figures 4 and 5, which is part of the fly wheel 10, Figure 3. A rocker arm 11, see Figures 1—2—4—5, is held stationary at the short end, and as the fly wheel 10, revolves the cam 22, forces the long end of the rocker arm 11, to reciprocate in a horizontal direction. By the employment of a suitable linkage 16, see Figures 4—5 this motion is transmitted to the sickle 17.

Figure 2:
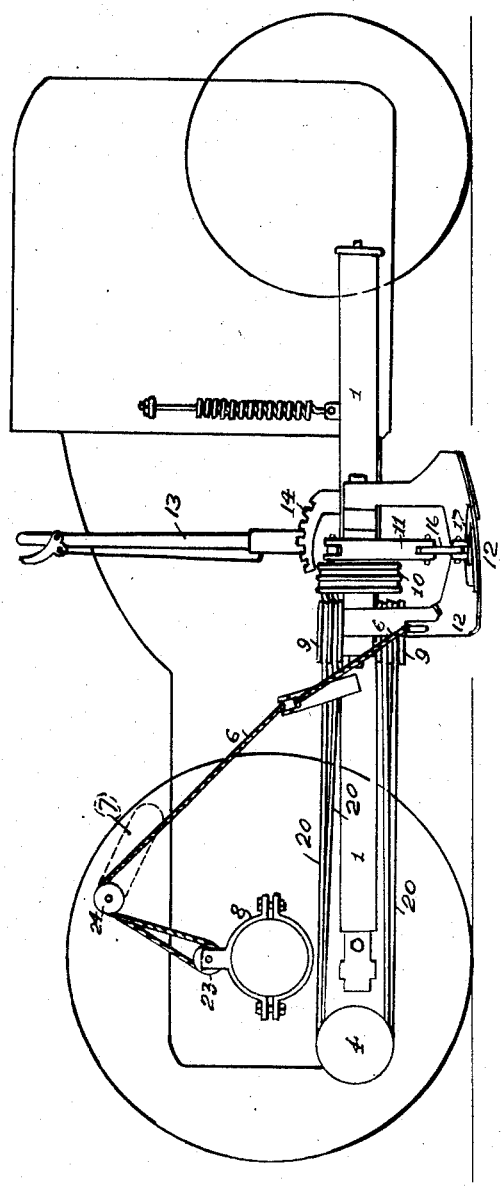
Figure 2 is a side elevation of the mowing attachment, secured to the tractor; the latter being indicated by broken lines.

The fly wheel 10, is driven from a pulley 4, see Figures 1—2—3, which is part of the tractor, through two V-belts 20. These belts change in travelling from a line parallel to the tractor to a line at right angles to the tractor upon passing around two idler pulleys 9, see Figures 1—2.

This method of driving the mowing mechanism by V-belts direct to the flywheel has not been used before in mowing machine construction.

The object is to reduce the manufacturing cost and to provide a means of turning the flywheel, while the mowing bar 12, is in a vertical position.

This is accomplished by revolving the flywheel 10, around the same shaft 19, see 1—3—4—5, that the mowing bar hinges on while raising to a vertical position.

The mowing bar is raised by means of a cable 6, operated by an arm 7; the arm being a part of the tractor—see Figures 1—2 and 3. One end of the cable is fastened to the mowing bar 12—see Figures 1—2—3. The other end of the cable is attached to the arm 7, it then passes under a roller 23, which is secured to the axle of the tractor by the clamp 8 (see Figures 2 and 3), and then back over roller 24, which is attached to arm 7—see Figure 2. Upon the arm 7 being rocked, the mowing bar raises three times as fast as said arm, because of compound leverage gained by going around pulleys 23 and 24—see Figure 2.

When the mowing bar 12, strikes an obstruction, it releases and drops back from a position held at right angles to the tractor, by the spring and ball detent 3 (see Figure 4), until the mowing bar is released from the obstruction.

A manually operated bell-crank lever 13 is pivoted to a sector 14, having notches to receive the usual spring actuated dog, whereby the cutter unit may be tilted to ride over stones or other like obstructions.

When it is desired to remove the mowing unit from the tractor, the attachment may be readily disconnected at the two-point fastening 21—21, which secures it to the frame.

I claim:

1. In a mowing attachment for a tractor, the combination of a mowing bar, a sickle, and driving means therefor, said driving means comprising a flywheel, a cam integral with said flywheel, means connecting said cam to one end of said sickle, power take-off means at one end of said tractor, a plurality of belt members engaging said power take-off means, said belt members extending parallel to said tractor and engaging an idler pulley intermediate the ends of the tractor whereupon the said belt members are caused to extend at right angle to said tractor for engagement with the said flywheel.

2. In a mowing attachment for a tractor, the combination of a mowing bar, a sickle, and driving means therefor, said driving means comprising a flywheel, a cam integral with said flywheel, means connecting said cam to one end of said sickle, a driving pulley at one end of said tractor, a plurality of belt members engaging said driving pulley, said belt members extending parallel to said tractor and engaging an idler pulley intermediate the ends of the tractor whereupon the said belt members are caused to travel in a direction at right angle to said tractor for engagement with the said flywheel.

JOSEPH E. HORSTE.